United States Patent [19]

Humphrey

[11] Patent Number: 4,924,775
[45] Date of Patent: May 15, 1990

[54] INTEGRATED TWO STAGE ROCKET

[75] Inventor: John M. Humphrey, Monte Sereno, Calif.

[73] Assignee: The United States of America as represented by the Secretary of the Army, Washington, D.C.

[21] Appl. No.: 431,604

[22] Filed: Nov. 2, 1989

[51] Int. Cl.⁵ .......................... F42B 4/14; F42B 15/10
[52] U.S. Cl. ...................................... 102/352; 102/374
[58] Field of Search .................... 102/352, 374; 60/253

[56] References Cited

U.S. PATENT DOCUMENTS

| | | | |
|---|---|---|---|
| 3,031,842 | 5/1962 | Ledwith | 60/35.6 |
| 3,888,079 | 6/1975 | Diesinger | 60/245 |
| 4,342,252 | 8/1982 | Hagelberg et al. | 102/352 X |
| 4,736,583 | 4/1988 | Hudema et al. | 102/374 X |

Primary Examiner—Peter A. Nelson
Attorney, Agent, or Firm—Robert L. Broad; Freddie M. Bush

[57] ABSTRACT

A rocket system wherein a frustoconical or cylindrical casing contains first and second rocket stages in series, with each stage having a nozzle extending in an aft direction. Each stage contains a solid rocket fuel, with the forward end of the fuel in the first stage filling and surrounding the nozzle of the second stage so that when the casing is severed along a plane aft of the second stage portion of the case the pressurized combustion products in the first stage forces the stages to separate.

4 Claims, 1 Drawing Sheet

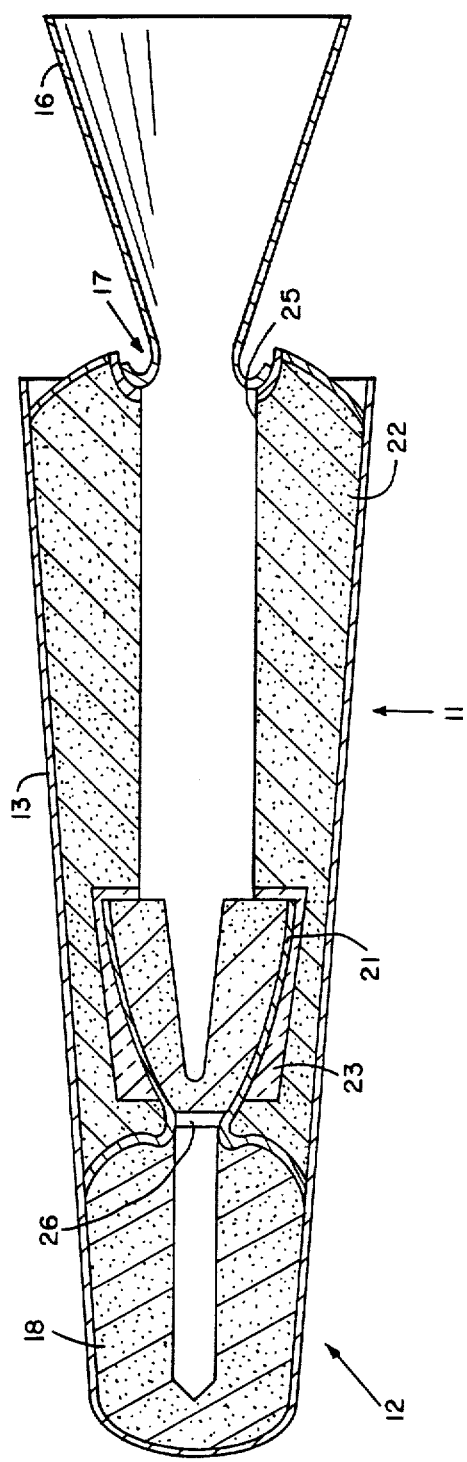

INTEGRATED TWO STAGE ROCKET

DEDICATORY CLAUSE

The invention disclosed herein was made in the course of or under a contract or subcontract thereunder with the Government and may be manufactured, used and licensed by or for the Government for governmental purposes without the payment to me of any roylaties thereon.

BACKGROUND OF THE INVENTION a. Field of the invention. This invention relates to rockets.

b. Prior art. Two stage rockets are known. The stages are arranged in series, with the second stage being stacked atop the first stage. The first stage is ignited and propels the rocket until its fuel is exhausted, at which time the two stages are separated and the fuel in the second stage is ignited to continue propulsion of the second stage.

One of the disadvantages of a typical two stage rocket is that the second stage of the rocket is very unstable during staging, i.e., the period between burnout of the first stage and full operation of the second stage, especially if the two stages separate in the atmosphere rather than above it. The reason for this is that, for a short time, the second stage has no aerodynamic control surfaces or thrust vector control to overcome destabilizing aerodynamic moments.

Another disadvantage of conventional two stage rockets is that, frequently, the first stage is not completely burned out when ignition begins in the second stage. This prevents a clean separation of the two stages and the first stage, still under propulsion, may re-contact the second stage and interfere with the trajectory of the second stage.

SUMMARY OF THE INVENTION

A rocket system wherein a frustoconical casing (including cylinders as the frustoconical limit) contains first and second rocket stages in series, with each stage having a nozzle extending in an aft direction. Each stage contains a solid rocket fuel, with the forward end of the fuel in the first stage filling and surrounding the nozzle of the second stage so that when the case is severed along a plane aft of the second stage portion of the case pressurized combustion products contained in the first stage portion of the case will separate the two stages. Staging is achieved by igniting the fuel in the second stage while the fuel surrounding the second stage nozzle is still burning, combustion products from the second stage fuel being vented through the first stage. Then, when the casing is severed, these combustion products supply a reverse thrust to the first stage to achieve a clean separation of the stages.

BRIEF DESCRIPTION OF THE DRAWING

The single FIGURE is a schematic cross sectional view of the integrated two stage rocket of this invention.

DETAILED DESCRIPTION OF THE INVENTION

Referring now in detail to the drawing, there is shown an integrated two stage rocket having a first stage 11 and a second stage 12 all contained in a single frustoconical (or cylindrical) shell or casing 13. The first stage 11 is provided with a moveable nozzle 16 which is connected to the aft end of the first stage by a joint 17 which allows movement of the nozzle 16 for steering the rocket.

The second stage 12 is provided with a fixed nozzle 21 positioned inside the casing 13 as shown, the second stage containing a solid rocket fuel 18 which can be ignited in a known manner. The first stage 11 is provided with a solid rocket fuel 22 the forward end of which fills and surrounds the nozzle 21 of the second stage 12, the fuel 22 being provided with a cavity 25 where the initial ignition of this fuel takes place. The outer surface of the nozzle 21 is covered with a rigid, heat resistant foam 23 for protection of this nozzle when the fuel surrounding it burns.

The second stage 12 is provided with a frangible burst disc 26 of a known type which is positioned in the nozzle 21 and is adapted to be blown out of this nozzle when the fuel 18 is ignited. A payload (not shown) may be fitted to or in the second stage in a known manner. Also, the forward end of the second stage may be provided with a steering mechanism (not shown) if desired or hot gas injection may be used for second stage TVC.

The casing 13 is provided with an ordnance cord 30 of a known type which encircles the casing 13 in a plane aft of the second stage portion of the casing. The purpose of the ordnance cord is to sever the casing 13 at the location of the cord and thereby separate the two stages when the fuel 22 in the first stage 11 up to the end of the nozzle 21 is exhausted. The axial location of the ordnance cord initiated stage separation plane may be optimally selected considering aerodynamic loads and performance.

In operation, the fuel 22 in the first stage 11 is ignited and the combustion products from the burning fuel propel the rocket. By the time the fuel 22 is sufficiently exhausted to expose the aft end of the nozzle 21, the fuel which originally filled the nozzle 21 is exhausted, leaving the nozzle open. At this time the fuel 18 in the second stage is ignited in a known manner, causing the disc 26 to be blown out of the nozzle 21. At this time, the combustion products from the fuel in the second stage are vented through the first stage until the casing is severed. When the fuel 18 is fully ignited, the ordnance cord 30 is actuated to instantly sever the casing 13 along a plane adjacent to the end of the nozzle 21. The second stage is then propelled by combustion products from the fuel 18 and the fuel 22 remaining around the nozzle until the fuel 22 surrounding the nozzle is exhausted, at which time propulsion of the second stage is effected by the fuel 18 in the second stage.

When the casing 13 is severed that portion of the fuel 22 surrounding the nozzle 21 remains and is burning. Since combustion products formed by this burning fuel continue to provide forward thrust to the second stage for a very brief period, there is no time period during staging when thrust is not being applied to the second stage. This greatly enhances the stability of the second stage during staging, especially when staging occurs in the atmosphere such that significant destabilizing aerodynamic moments may be present. At the same time the combustion products which are providing forward thrust to the second stage also provide reverse thrust to the first stage. This insures a clean separation of the stages and keeps the separated first stage from re-contacting the aft end of the second stage and interfering with its trajectory.

By using the structure disclosed herein a rocket of smaller volume and shorter length can be used. This makes the rocket more useful in those applications where volume must be kept as low as possible, as in the case of rockets to be launched from submarines. The shorter length reduces the pitch moment of the rocket for better maneuverability.

What is claimed is:

1. A rocket system, comprising,
   a. a frustoconical or cylindrical casing having an aft end and a forward end, said aft end having a larger or equal diameter than the forward end,
   b. a first rocket stage positioned in said aft end of the casing and having a nozzle extending therefrom in an aft direction,
   c. a second rocket stage positioned in the forward end of the casing, and having a second nozzle extending therefrom in an aft direction, said first stage containing a solid fuel so positioned that a forward end of said fuel fills and surrounds the second nozzle such that when the case is severed along a plane aft of the second stage portion of the case pressurized products of combustion from the first stage portion of the case force the stages apart.

2. The rocket system of claim 1 wherein the casing is provided with an ordnance cord encircling the casing in a plane aft of the second stage portion of the case for severing the casing to separate the stages.

3. The rocket system of claim 2 wherein the second nozzle is provided with a frangible disc positioned to prevent burning fuel from the first stage from igniting fuel in the second stage.

4. The method of staging a two stage rocket, comprising
   a. providing a rocket having first and second stages in series, each of said stages containing a solid fuel, said second stage having a nozzle embedded in the solid fuel in the first stage,
   b. igniting the fuel in the first stage to propel the rocket,
   c. allowing the fuel in the first stage to burn until the nozzle of the second stage is exposed,
   d. igniting the fuel in the second stage and allowing combustion products from said second stage fuel to vent through the first stage while first stage fuel surrounding the second stage nozzle is still burning, and
   e. severing the casing along a plane aft of the second stage portion of the case to allow the combustion products from burning fuel in both stages to separate the stages.

* * * * *